(12) United States Patent
Brink et al.

(10) Patent No.: US 7,450,344 B2
(45) Date of Patent: Nov. 11, 2008

(54) REMELTED MAGNETIC HEAD SUPPORT STRUCTURE IN A DISK DRIVE

(75) Inventors: Damon Douglas Brink, Goleta, CA (US); Kevin Patrick Hanrahan, Santa Barbara, CA (US); Ryan John Schmidt, Santa Barbara, CA (US); David Django Dexter, Buellton, CA (US)

(73) Assignee: Intri-plex Technologies, Inc., Santa Barbara, CA (US)

( * ) Notice: Subject to any disclaimer, the term of this patent is extended or adjusted under 35 U.S.C. 154(b) by 557 days.

(21) Appl. No.: 10/712,187

(22) Filed: Nov. 12, 2003

(65) Prior Publication Data

US 2005/0099731 A1  May 12, 2005

(51) Int. Cl.
G11B 5/48 (2006.01)
(52) U.S. Cl. .................................................. 360/244.6
(58) Field of Classification Search ............... 360/244.2, 360/244.5, 244.8, 245, 246.4, 244.6
See application file for complete search history.

(56) References Cited

U.S. PATENT DOCUMENTS

| | | | | |
|---|---|---|---|---|
| 3,676,610 A | * | 7/1972 | Moss et al. | 360/125.01 |
| 3,837,910 A | * | 9/1974 | Van der Laan et al. | 264/613 |
| 3,999,216 A | * | 12/1976 | Berchtold | 360/125.01 |
| 4,451,532 A | * | 5/1984 | DePalma et al. | 428/336 |
| 5,110,687 A | | 5/1992 | Abe et al. | |
| 5,226,946 A | | 7/1993 | Diehm et al. | |
| H1221 H | | 8/1993 | Best et al. | |
| 5,252,120 A | | 10/1993 | Finkl et al. | |
| 5,759,303 A | | 6/1998 | Mihalisin et al. | |
| 5,860,626 A | * | 1/1999 | Moser | 244/200 |
| 5,891,551 A | * | 4/1999 | Gibbs | 428/156 |
| 5,973,883 A | * | 10/1999 | Yanagisawa | 360/244.9 |
| 6,071,358 A | | 6/2000 | Okita et al. | |
| 6,193,191 B1 | * | 2/2001 | Falcimaigne et al. | 244/130 |
| 6,201,664 B1 | * | 3/2001 | Le et al. | 360/244.9 |
| 6,273,973 B1 | | 8/2001 | Parayil et al. | |
| 6,295,309 B1 | | 9/2001 | Benz et al. | |
| 6,545,842 B2 | * | 4/2003 | Rao et al. | 360/244.2 |
| 6,551,372 B1 | | 4/2003 | Ewing et al. | |
| 6,602,362 B2 | | 8/2003 | Tomioka et al. | |

OTHER PUBLICATIONS

Yoshiyuki Tomita, "Effect of Morphology of Nonmetallic Inclusions on Tensile Properties of Quenched and Tempered 0.4C-Cr-Mo-Ni Steel", *Materials Characterization*, vol. 34, pp. 121-128, 1995.

* cited by examiner

*Primary Examiner*—Allen T Cao
(74) *Attorney, Agent, or Firm*—Barcelo & Harrison, LLP; Joshua C. Harrison

(57) ABSTRACT

A magnetic head supporting structure comprises a metal purified by vacuum arc remelting, vacuum induction melting, electroslag remelting, or electroslag remelting under vacuum, in at least one of the regions that undergo plastic deformation during disk drive manufacture, to reduce small hard inclusions that might be released into the disk drive interior environment.

6 Claims, 8 Drawing Sheets

REMELTED MAGNETIC HEAD SUPPORT STRUCTURE IN A DISK DRIVE

BACKGROUND OF THE INVENTION

1. Field of the Invention

This invention relates to assemblies for supporting read/write heads adjacent rotating disks in disk drives.

2. Background Information

In hard disk drives, magnetic heads read and write data on the surfaces of co-rotating disks that are co-axially mounted on a spindle motor. The magnetically-written "bits" of written information are therefore laid out in concentric circular "tracks" on the surfaces of the disks. The disks must rotate quickly so that the computer user does not have to wait long for a desired bit of information on the disk surface to translate to a position under the head. In modern disk drives, data bits and tracks must be extremely narrow and closely spaced to achieve a high density of information per unit area of the disk surface.

The required small size and close spacing of information bits on the disk surface has consequences on the design of the disk drive device and its mechanical components. Among the most important consequences is that the magnetic transducer on the magnetic head must operate in extremely close proximity to the magnetic surface of the disk. However, because there is relative motion between the disk surface and the head due to the disk rotation and head actuation, continuous contact between the head and disk can lead to tribological failure of the interface. Such tribological failure, known colloquially as a "head crash," can damage the disk and head, and usually causes data loss. Therefore, the magnetic head is typically designed to be hydrodynamically supported by an extremely thin air bearing so that its magnetic transducer can operate in close proximity to the disk while physical contacts between the head and the disk are minimized or avoided.

The head-disk spacing present during operation of modern disk drives is extremely small—measuring in the tens of nanometers. Obviously, for the head to operate so closely to the disk without excessive contact, the disk must be very smooth and flat. Furthermore, the disk must be made of a stiff material to minimize out-of-plane motion (known as "disk flutter") induced by surrounding air during rotation and other factors. The total capacity of the disk drive is also enhanced if the disks are made thin, so that more disks (and therefore more data-containing disk surfaces) can be packed into the disk drive. The simultaneous requirements for smoothness, flatness, thinness, and stiffness demand that the disk substrate be made of a high quality material such as pure aluminum. Pure aluminum is sometimes preferable to aluminum alloys because the non-metallic inclusions present in many aluminum alloys can adversely affect disk smoothness after the magnetic coating is deposited thereupon, causing asperities on the surface that later force the head away from the disk. The resulting temporary increases in head-disk spacing cause magnetic read/write errors known as information "bit drop outs". To ensure an acceptable surface finish, and thereby avoid bit drop outs, designers have often chosen pure aluminum for use as substrates for magnetic disks. For example, U.S. Pat. No. H1,221 discloses the use of pure aluminum rather than an aluminum alloy as a material for magnetic disk substrates, to reduce inclusions that might adversely affect the smoothness of the layers deposited on such substrates, where the deposited layers would cover such inclusions in the disk drive.

Another consequence of the close spacing of information bits and tracks written on the disk surface is that the spindle rotation and head actuator motion must be of very high precision. The microscopic departure of the disk rotation from perfect rotation is often called "run out." Imprecision or defects in the spindle bearings can lead to spindle run out that does not repeat itself as an integer multiple of the spindle speed (so called "non-synchronous run out"). The head actuator must be actively controlled to follow non-synchronous run out, and accordingly, non-synchronous run out is considered as a disturbance to be minimized. Consequently, spindle bearings must be made of high quality materials to minimize non-synchronous run out over the lifetime of the bearings. If, for example, low grade or impure steel were used in a disk drive spindle bearing, non-metallic inclusions in the steel might cause surface deformities that increase non-synchronous run out. Such non-metallic inclusions might also adversely affect the structural properties of the bearing components, leading to so-called nucleation sites that promote fatigue cracking and shorten bearing life. Accordingly, disk drive designers have used purified steels in disk drive spindle bearings for reasons of surface finish, precision operation, and fatigue strength. For example, U.S. Pat. No. 5,110,687 discloses that inclusions in the aluminum rotor of a spindle in a hard disk drive can cause surface irregularities that can adversely affect precision of rotation. Another U.S. Pat. No. 6,071,358, discloses the use of purified steel having reduced non-metallic inclusions to improve mechanical properties of hard disk drive spindle bearings and thereby increase their life.

The head actuator in modern disk drives must accelerate very quickly to reach information tracks containing desired information, so that the time to access desired information is acceptable to the user. Therefore, the head supporting structure through which a head is mounted to the actuator can not be designed to be too massive. On the other hand, the head supporting structure still must be stiff enough to precisely control the position of the head during operation. Furthermore, the stiffness of the head supporting structure must be sufficient also to limit deflection that might cause contact with the disk during large mechanical shock events occurring under non-operating conditions.

In FIG. 1, an exploded view of three of the components of a magnetic head support structure is shown. The depicted components are the actuator arm 8, suspension spring 12, and swage mount 19. The actuator arm pivot bearing (not shown) facilitates rotation of the actuator arm 8 about axis 6.

Hub 20 of swage mount 19 fits through boss hole 23 in suspension spring 12 and the underside of suspension spring 12 rests on and is spot welded to swage mount 19. Hub 20 also fits through boss hole 22 in actuator arm 8. A swage ball (not shown) of slightly larger diameter than the interior diameter of hub 20 is forced through hub 20 after it has been inserted through boss holes 23 and 22. This "swaging process" causes plastic deformation of hub 20 to a larger diameter, causing it to be "swaged" or to have an interference fit attachment to actuator arm 8. Top surface 18 of suspension spring 12 is then in contact with the under surface of actuator arm 8 near boss hole 22.

Suspension spring 12 is designed to flex out-of-plane in "bend area" region 24 but to resist in-plane deflection. Most suspension spring designs include a region 30 of reduced thickness or removed material, within "bend area" region 24, to enhance out-of-plane flexing or to control resonant behavior of the suspension spring. During manufacture, "bend area" region 24 is deliberately and permanently plastically deformed to include an out-of-plane bend. The purpose of this bend is to impart a pre-load force on the magnetic recording head after the suspension spring 12 is elastically straightened during disk drive assembly. The suspension spring is designed to resist bending of load beam portion 26. The magnetic head (not shown) pivots on dimple 38 but can not translate with respect to dimple 38 because such translation is prevented by a gimbal (not shown) to which the head is glued and that is spot welded to load beam 26. It is through dimple 38 that the pre-load force is transmitted from the load beam 26 to the head.

FIG. 2 shows a top view of swage mount 19 showing the location of view line 3-3. FIG. 3 is a side cross-sectional view of swage mount 19 along the view line 3-3. The cross-hatched region denotes an interior region of the metal (such as 300 series stainless steel) from which the swage mount is made. This interior region would not normally be visible except for an imaginary cross-section made along view line 3-3.

The requirement for a magnetic head supporting structure with low mass but high stiffness has affected the choice of materials used for related sub-components, such as the suspension spring, swage mount, and actuator arm. Typically, suspension springs and swage mounts have been fabricated from stainless steel, whereas the actuator arm has been fabricated of alloys of aluminum, magnesium, and beryllium. Since stiffness and mass are more critical design constraints on these sub-components than fatigue life, the associated material choices heretofore have not been affected by concern for minimizing microscopic inclusions that might form during the processing of the raw materials.

FIG. 4 is an expanded view of region 32 of the cross section shown in FIG. 3. The diagonal cross-hatch lines have been omitted from FIG. 4 in order to conceptually depict material inclusions 42 existing in the metal 40 from which the swage mount 19 is fabricated. Inclusion 44 is depicted to be located on or very near the surface 30 of the swage mount 19.

Remelted metals have never been used to fabricate components of the head supporting structure to improve post-fabrication cleanliness. Past attempts to increase post-fabrication cleanliness of components of the head supporting structure have instead focused on cleaning and/or plating. Disk drive designers believed that microscopic inclusions in the metal from which head supporting structure components are fabricated either remain in the metal or are adequately removed by pre-assembly cleaning.

Uses of purified remelted metals have been restricted to applications where material inclusions would have a significant effect on the component's structural properties (such as surface finish or fatigue life). Remelting processes used in the art to reduce inclusions and thereby improve the structural or surface finish characteristics of mechanical components include vacuum arc remelting (VAR), vacuum induction melting (VIM), and electroslag remelting (ESR). For example, U.S. Pat. No. 6,551,372, U.S. Pat. No. 5,759,303, and U.S. Pat. No. 5,226,946 describe the use of one or more of these remelting processes to improve the structural strength or longevity of gas turbine engine components by reducing inclusions that can lead to nucleation sites, cracks, and fatigue failure. U.S. Pat. No. 5,252,120 describes a surface-finish motivation to reduce inclusions in steel by purification, where the steel is to be used in a "lens-quality" mold.

In contrast, the magnetic head supporting structure is not an application where the use of remelted materials would be justified conventionally by concerns for fatigue strength or surface finish, and accordingly, no motivation has been expressed in the art to use costly remelted metals to fabricate a head supporting structure.

Stainless steels previously used in magnetic head supporting structures have been purified to a lesser extent by a process known as Argon Oxygen Decarburization (AOD). AOD can be used to refine and purify metal so as to ensure improved mechanical properties. In AOD, submerged injectors inject oxygen, argon, nitrogen, and sometimes carbon dioxide, into molten metal heated by an electric arc or coreless induction furnace. Because the blowing is submerged, the gas/metal contact is enhanced, although oxygen is sometimes top-blown over the molten steel. The ratio of oxygen to inert gas injected is decreased as the carbon level in the steel decreases, resulting in efficient carbon removal without excessive oxidation. The primary objectives of the gas injection is to cause a shift in decarburization thermodynamics, remove dissolved gasses (nitrogen and hydrogen), and reduce nonmetallic inclusions. The motivation to reduce the number and size of material inclusions has been to improve the ductility and toughness of the refined steel. Disk drive designers have been satisfied with the ductility and toughness of AOD refined steel and have known no justification to use more costly but purer remelted steels.

However, the present inventors discovered that microscopic inclusions can be released by the metal from which the head supporting structure is made—even after the head supporting structure has been thoroughly cleaned—and the release can be accelerated by disk drive assembly processes that include the deliberate plastic deformation of a portion of the head supporting structure. That is, such deliberate plastic deformation might cause certain material inclusions to be released that cleaning steps would not release. Examples of such processes include the "swaging" process, and the process by which a permanent out-of-plane curvature is deliberately given to the "bend area" of the suspension spring (in the spring's free state) so that it can provide a pre-load force to the head (when the suspension spring is elastically straightened during assembly of the disk drive).

Tribological problems in magnetic disk drives sometimes have non-obvious solutions that, once known and understood, give one disk drive manufacturer a competitive edge over another. Recognizing that released inclusions can comprise microscopic oxide particles that can later contaminate the head-disk interface and ultimately lead to a head crash, the present inventors fabricated novel head supporting structures using remelted metals. Post-manufacture surface microscopy and material analysis of isolated contaminants confirmed the merit of the idea.

SUMMARY OF THE INVENTION

A magnetic recording head supporting structure has a surface with fewer than 40 inclusions having hardness 4 or higher on Mohs' Scale and having largest dimension between 0.5 µm and 2 µm, per square millimeter.

BRIEF DESCRIPTION OF THE DRAWINGS

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE PREFERRED EMBODIMENTS

Figure 1:
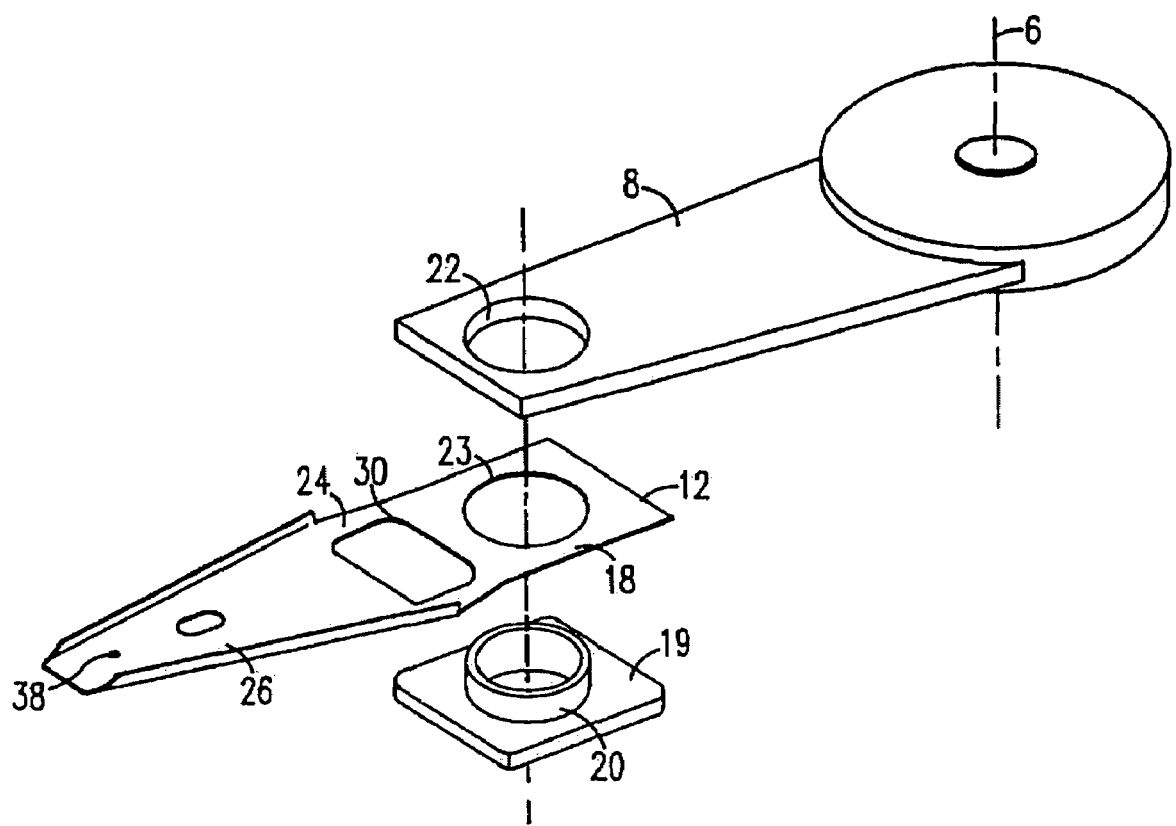
FIG. 1 is an exploded view of a magnetic head support structure.
Figure 2:
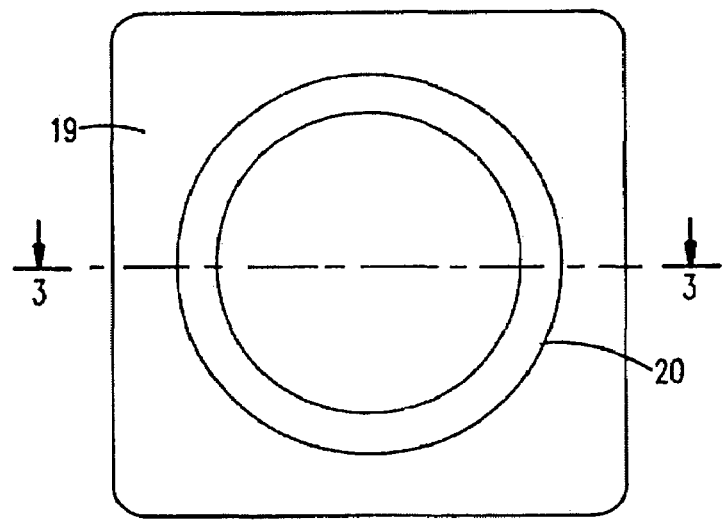
FIG. 2 is a top view of the swage mount shown in FIG. 1.

The present inventors discovered release mechanisms for inclusions in magnetic recording head support structures and recognized that the range of inclusions that might significantly affect the material properties of bulk metal is different from a range of tribological interest in a disk drive—different in terms of size, hardness, and quantity. Components of the head supporting structure were then fabricated from materials purified well beyond the purity necessary for acceptable mechanical properties.

Inclusions smaller than approximately 5 μm do not significantly affect the bulk mechanical properties of metals. Accordingly, modern applications for purified metals generally do not require specification or measurement of inclusions smaller than 5 μm. Measurement of smaller inclusions during metal refining and purification would be costly because it would require higher resolution, which would increase measurement time and therefore reduce throughput. Nevertheless, smaller inclusions can have large tribological effect in the interior environment of a disk drive if such inclusions are released as particles after cleaning steps have been completed. For example, although inclusions in the size range 0.5-2 μm do not significantly degrade the mechanical properties of stainless steel, if such inclusions are released as particles into the interior environment of a disk drive they might cause severe tribological problems leading to head crash. Particles that are smaller than 0.5 μm, when introduced into the interior environment of a disk drive, often get carried away by the air flow caused by rotation of the magnetic disks and are then removed by filters positioned in the path of the air flow. Therefore, certain embodiments of the present invention are focused on an inclusion size range that was not previously considered in the art.

The hardness of an inclusion is of greater concern when considering tribological consequences after release as a particle into the interior environment of a disk drive than when considering the mechanical properties of the bulk metal. For example, "hard" particles (e.g. particles 7 or harder on the Mohs' Scale, including many metal oxides and intermetallics containing elemental combinations such as AlMgO, SiO, AlO, MgO, AlSiO, MgSiO, AlCaO, AlMgCaO, AlSiCaO, and others) and certain "suspect" particles (e.g. particles of 4-6 on the Mohs' Scale that, depending on morphology and deformation response, may be determined to have similar tribological effect as "hard" particles) can have markedly greater impact on disk drive reliability and life than softer particles (such as CaO, CaSO, and others). This distinction does not hold when considering the effect of inclusions on the mechanical properties of bulk metal. Therefore, certain embodiments of the present invention are focused on a range of inclusion hardness that was not previously considered in the art.

The quantity of inclusions also has different consequences on cleanliness (if those inclusions are released as particles in the interior environment of a disk drive) than on the mechanical properties of the bulk metal. The effect of inclusion quantity on the mechanical properties of the bulk metal has a threshold below which inclusions have no significant effect at all—above that threshold, the deleterious effect of inclusions on mechanical properties increases continuously as inclusion quantity is increased. However, if inclusions are released as particles in the interior environment of a disk drive, then there exists a quantitative threshold above which tribological failure is assured—and below that threshold the chance of tribological failure is continuously reduced as quantity is decreased. Therefore, certain embodiments of the present invention are concerned with metal purities beyond those previously considered in the art.

The AOD-refined stainless steel used in magnetic head supporting structure components was studied experimentally. Parts and incoming material were analyzed on a JEOL 6360LV scanning electron microscope (SEM), equipped with an EDAX Falcon energy dispersive x-ray spectroscopy (EDS) system. The tool was run in backscatter composition mode in order to more readily observe foreign materials, and examples of metal oxide inclusions were readily observed at both the part and strip levels. Several images at higher resolution were captured to verify particle (inclusion) morphology, and the compositions of the particles were measured with EDS.

Figure 5:
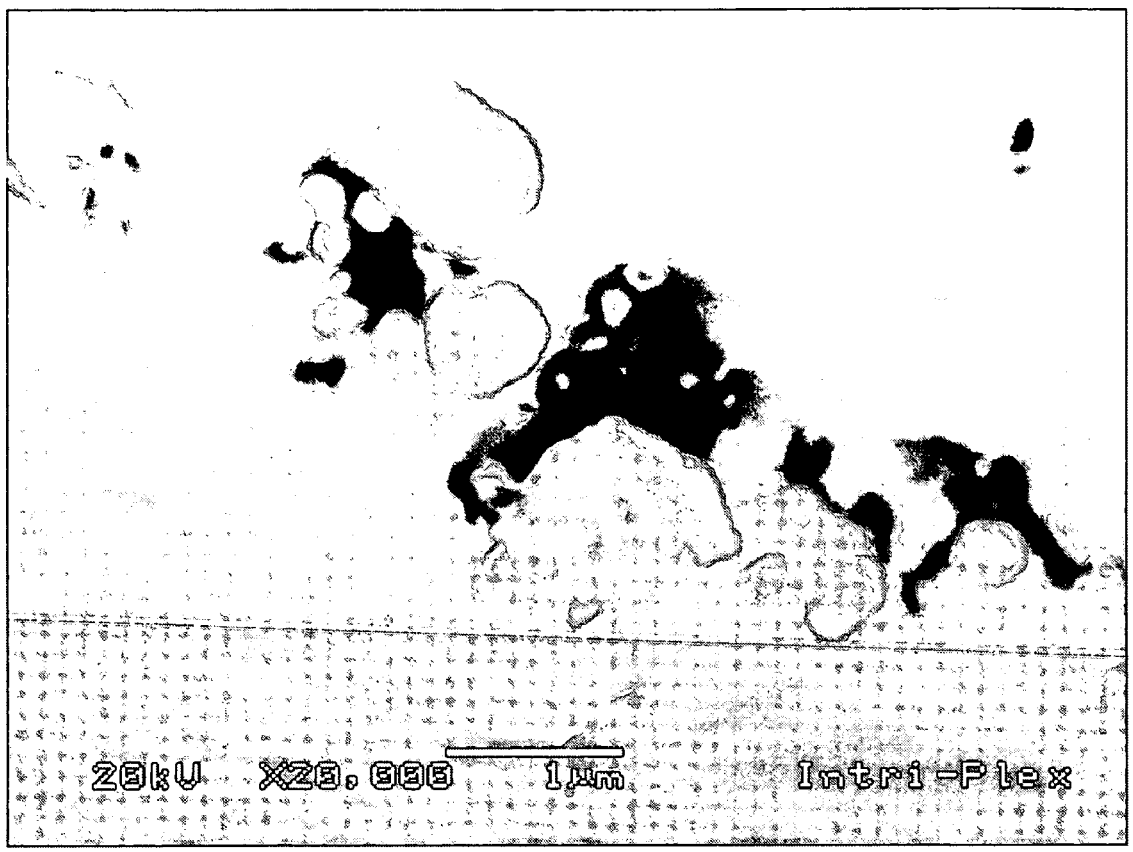
FIG. 5 is a microscopy image of an example inclusion.
Figure 6:
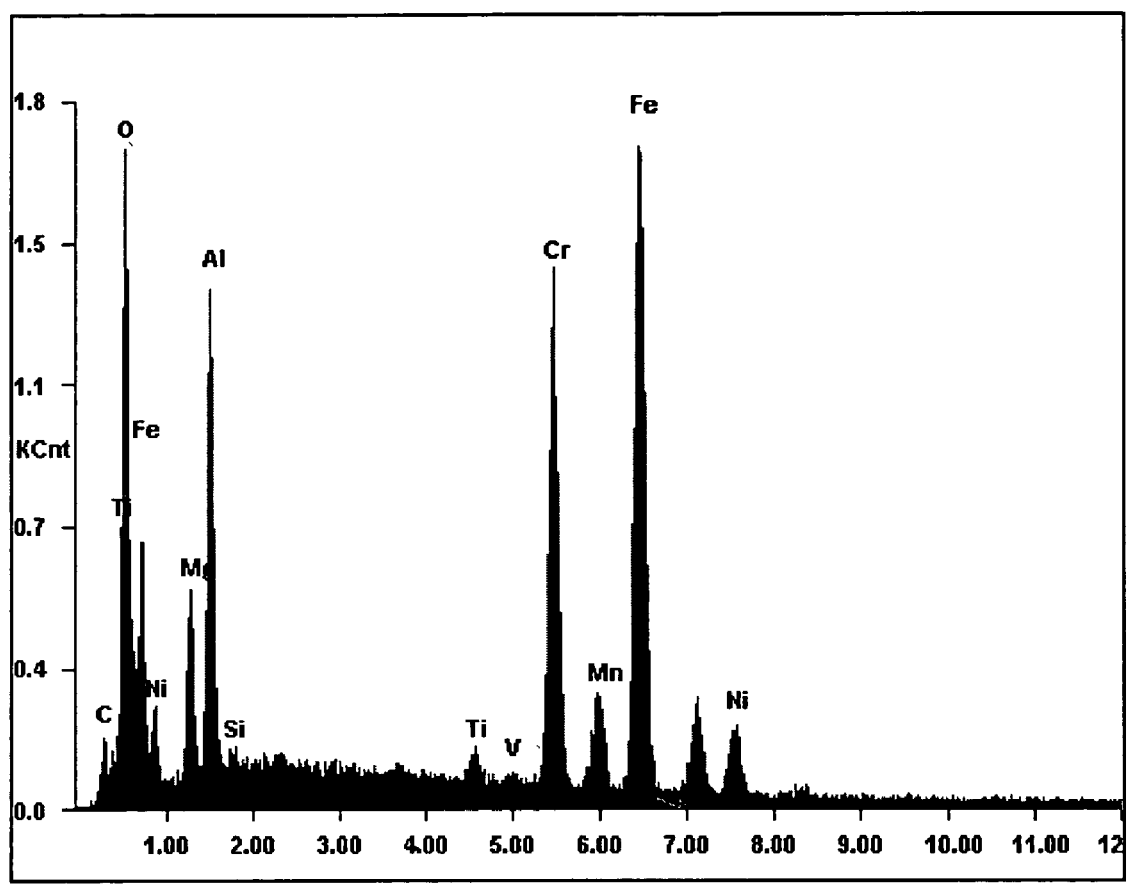
FIG. 6 is an EDS spectra of the composition of the inclusion shown in FIG. 5.

The observed metal oxide inclusions ranged in size from less than 0.1 μm to greater than 10 μm, with the smaller being more prevalent in the microstructure by approximately one order of magnitude. The inclusions tended to be concentrated in particular areas, and lines or groupings of the particles could often be observed along the rolling direction. This evidence suggested that the smaller particles may have formed from the breakup and redistribution of larger ones during processing. A microscopy image of an example inclusion is shown in FIG. 5. An EDS spectra of the composition of this inclusion is shown in FIG. 6, and indicates high levels of Al, Mg, and O, which mirrors the spectrum of particles identified as being responsible for drive failures.

Whereas typical AOD-refined stainless steels used previously for magnetic head supporting structures had approximately 70-120 hard particles (in the size range 0.5 to 2 μm) per square millimeter, remelted stainless steels having fewer than 40 hard particles (in the size range 0.5 to 2 μm) per square millimeter are preferable for tribological benefit in magnetic disk drives.

Several remelting processes can be used to purify stainless steel and other metals. Vacuum induction melting (VIM) produces liquid metal under vacuum in an induction-heated crucible. The oxygen-free atmosphere limits the formation of nonmetallic oxide and nitride inclusions. However, vacuum induction furnaces lack an active liquid slag that would be capable of absorbing oxides and sulfides if the slag were in contact with the molten metal. Since undesirable reaction products can precipitate only on the crucible walls, the purification capability of the VIM method is often limited unless used in conjunction with another remelting method.

Vacuum arc remelting (VAR) is a process by which a metal electrode is melted via a DC arc in an evacuated atmosphere, and the molten metal is collected in a water cooled copper mold. Oxide inclusions are reduced by chemical and physical processes that occur during melting of the electrode in vacuum. The plasma arc at the tip of the melting electrode disperses the molten metal droplets under vacuum, which enhances the effectiveness of the process. Oxides and nitrides can be thermally dissociated and removed by conversion into the gas phase. Vacuum arc double electrode remelting (VADER) is a variant of the VAR process utilizing more than one consumable electrode, where the arc is struck between two consumable electrodes.

Electroslag remelting (ESR) is a process by which a metal electrode is melted in a water-cooled copper crucible, usually under normal atmosphere. The electrode is melted while immersed in a slag that is heated by an electrical current flowing through the slag. Molten metal droplets from the melting electrode fall through the liquid slag, temporarily interacting with the slag, and are then collected in a water cooled mold. Reactions between the slag and the metal droplets significantly reduce sulfur, oxide particles, and non-metallic inclusions. However, because the ESR process is usually carried out in an air atmosphere the metal can oxidize both on the electrode surface and on the slag surface. To limit the formation of oxides, the slag may be deoxidized with aluminum or the entire process carried out under reduced atmospheric pressure. Carrying out the ESR under vacuum conditions (VAC-ESR) prevents oxidation of the melt and helps remove dissolved gasses such as hydrogen and nitrogen. In this way, VAC-ESR can combine the benefits of VAC remelting and ESR remelting, in purifying metals such as stainless steel. If the reduction of hard inclusions such as metal oxides is of particular concern, then the use of a non-metal oxide slag may be preferable. For example, the use of a slag comprising calcium biflouride ($CaF_2$) in the ESR or VAC-ESR process can reduce the amount of metal oxides in the re-melted steel.

Figure 3:
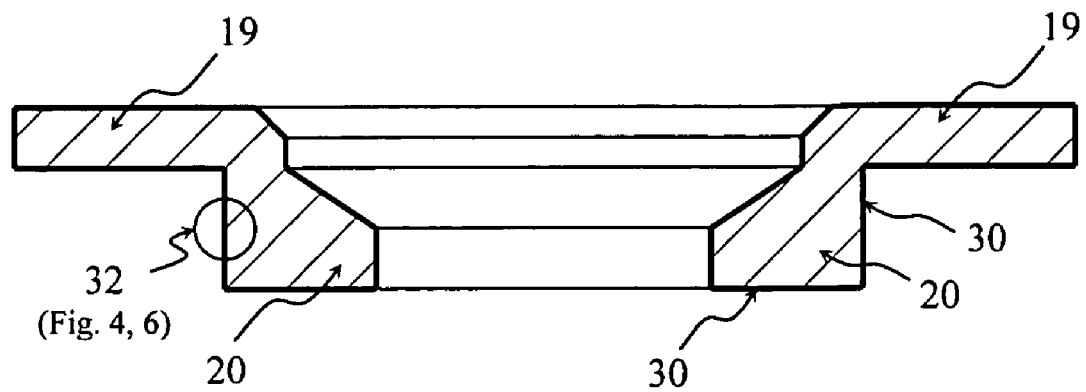
FIG. 3 is a side cross-sectional view of the swage mount of FIG. 2 along the view line 3-3.
Figure 4:
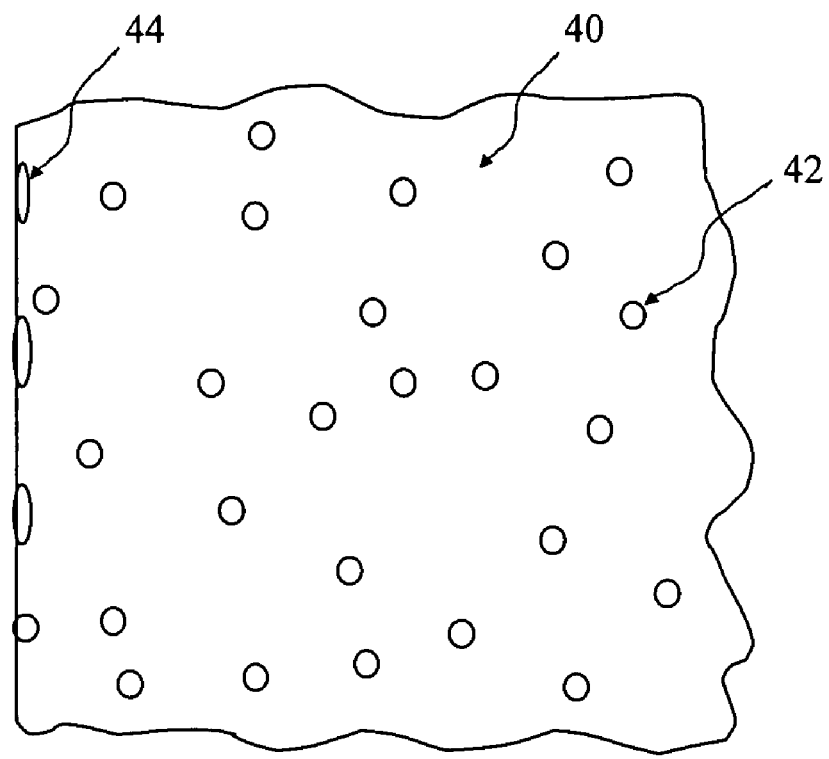
FIG. 4 is an expanded view of the cross section shown in FIG. 3, conceptually showing material inclusions remaining after prior art AOD refinement of the metal.
Figure 7:
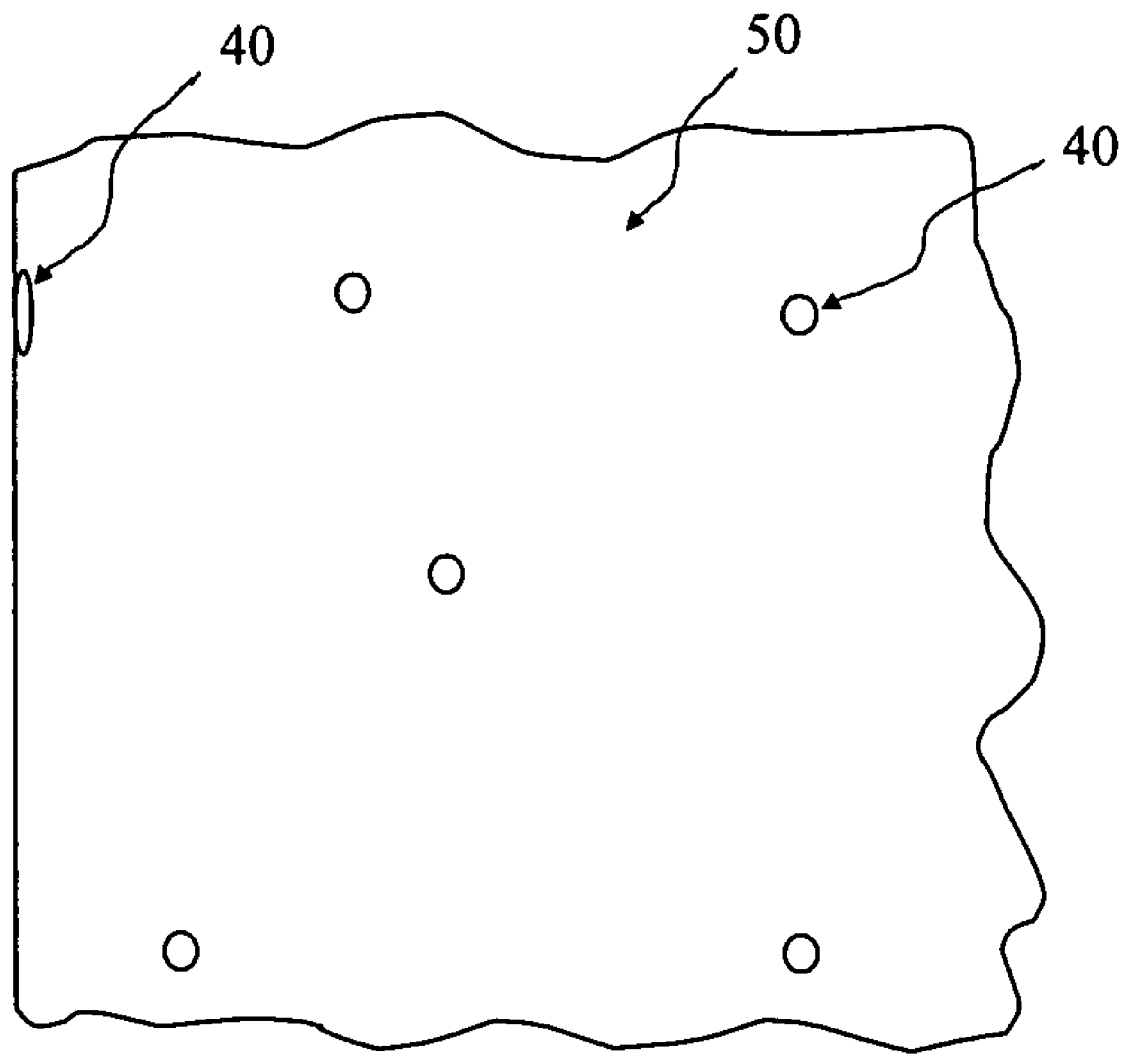
FIG. 7 is an expanded view of the cross section shown in FIG. 3, conceptually showing material inclusions remaining after remelt refinement of the metal.

FIG. 7 is an expanded view of a cross sectional area of a magnetic head support structure according to an embodiment of the present invention, and is intended to be comparable to the prior art cross sectional area 32 shown in FIG. 3 and FIG. 4. FIG. 7 conceptually shows fewer material inclusions remaining both in the interior and on the surface after remelt refinement of the metal, in comparison with FIG. 4 which can be understood as conceptually showing a cross sectional area of a prior art support structure refined only with AOD. When ESR stainless steel is used in the fabrication of swage mount components of the magnetic head support structure, significantly reduced levels of surface inclusions are observed, which in turn reduces post-swage contaminants within the disk drive.

Particulate contamination on disk drive components can be investigated by several methods. For example, a component might be subjected to high intensity ultrasonic cleaning in water. The water containing the removed particles can then be analyzed by a liquid particle counter system (LPC) that determines the sizes and counts of particles using the principle of light scattering. Alternately, the particles can be analyzed by hard particle analysis (HPA) wherein the water containing the removed particles is filtered and the collected particles analyzed by scanning electron microscopy (SEM) equipped with energy dispersive x-ray spectroscopy (EDS). Ultrasonic cleaning followed by LPC, or SEM/EDS can also be used to indicate how well particles on a surface adhere thereto. That is, the amount of particles that are removed by ultrasonic cleaning is an indication of surface adhesion. Surface adhesion can also be investigated via a Tape Test. Tape is placed on the surface of the swage mount, removed and then viewed by SEM to determine the type and amount of particles that appear on the surface of the tape.

Figure 8:
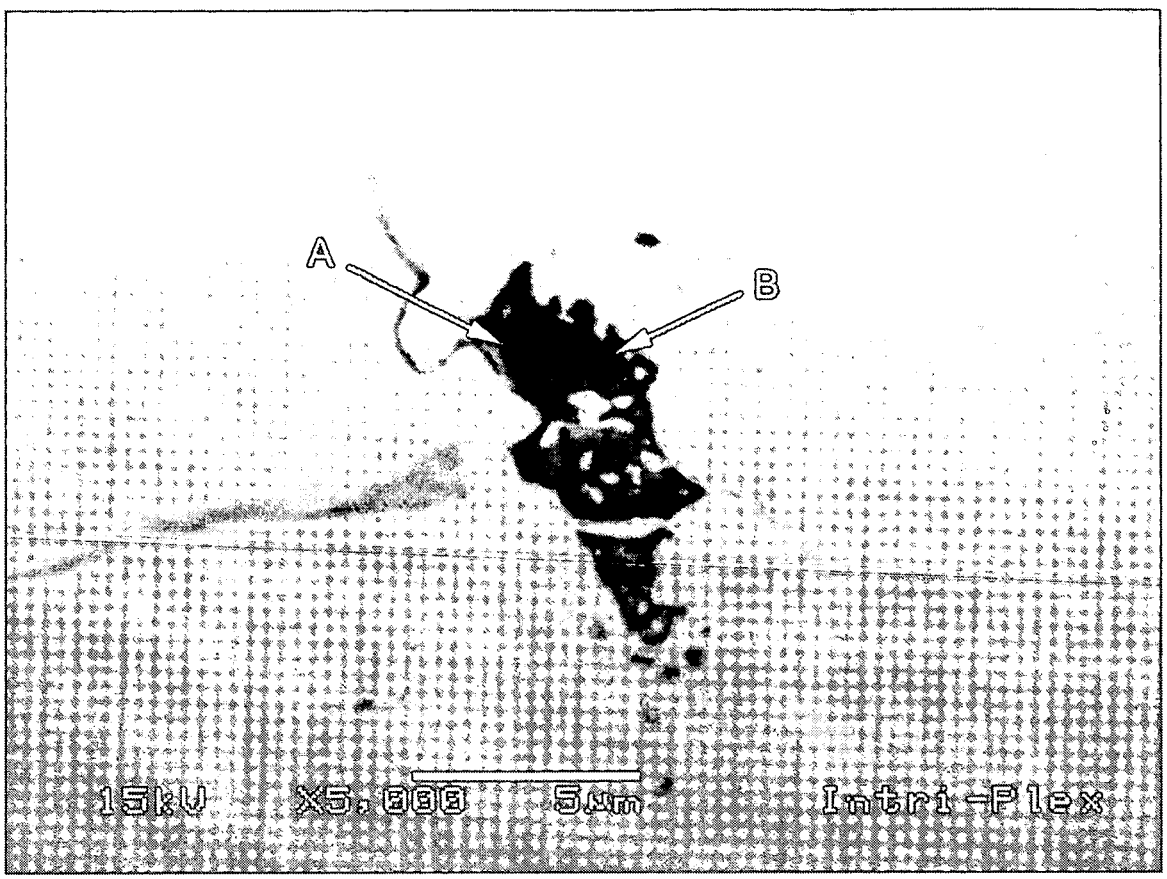
FIG. 8 shows a typical hard inclusion embedded in the surface of a stainless steel magnetic head support structure component before plastic deformation.
Figure 9:
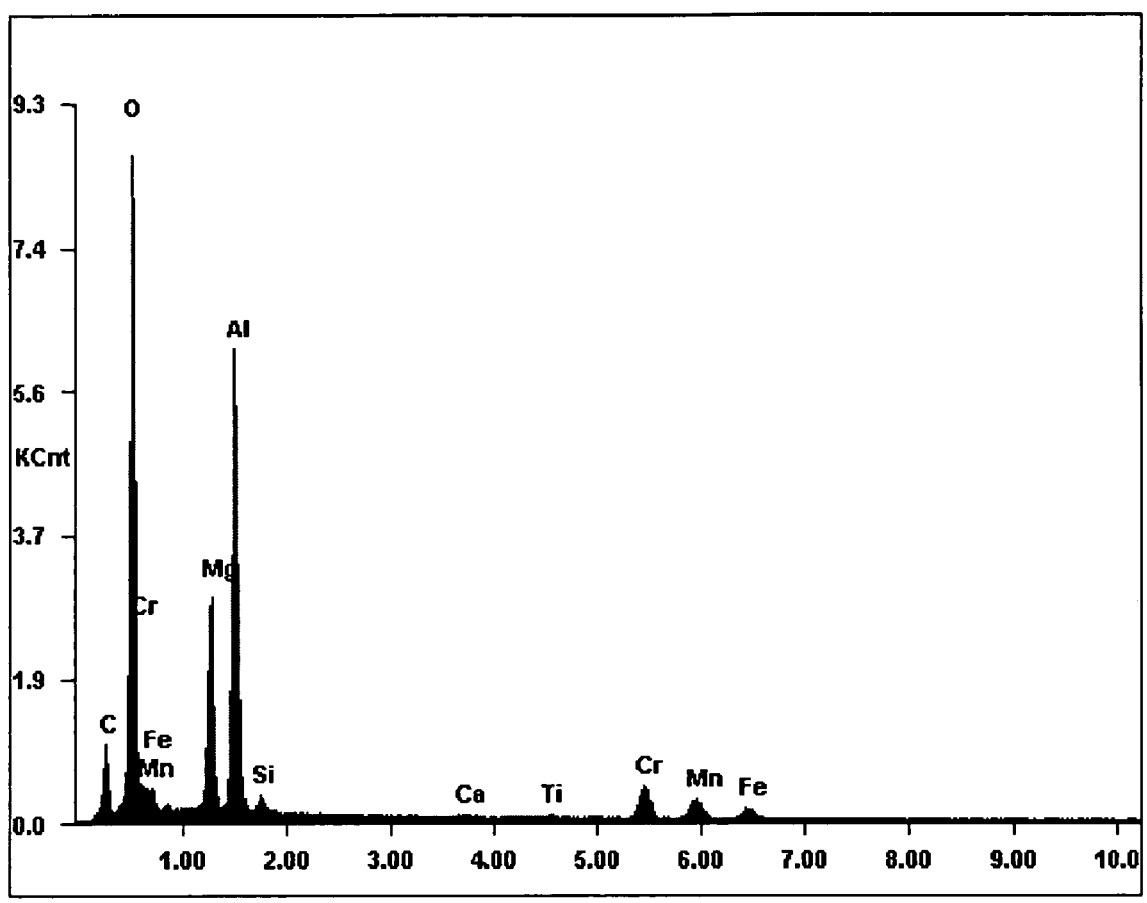
FIG. 9 is an EDS spectra showing the composition of the hard inclusion of FIG. 8.

FIG. 8 shows a typical hard inclusion embedded in the surface of a stainless steel swage mount of the type used in the data storage industry as a component of the magnetic head support structure. The image was captured from a JEOL 6360LV scanning electron microscope with a backscatter detector, wherein the hard inclusions show as darker particulates in the center of the figure and the surrounding stainless steel is brighter in contrast due to the higher density. The composition of the inclusion is typical for this material, consisting of refractory oxides containing largely aluminum, magnesium, and oxygen. An energy spectra taken from an in-situ Energy Dispersive Spectroscopy system is shown in FIG. 9 and highlights the characteristic peaks that identify the elemental composition of the material.

After initial characterization of the inclusion morphology, the surface of the swage mount that contained the inclusion was subject to strain exceeding the elastic range induced by bending. This type of plastic deformation is common in the data storage industry. For example, plastic deformation is induced during swaging of swage mounts and when forming suspension springs to which the swage mount is attached.

Figure 10:
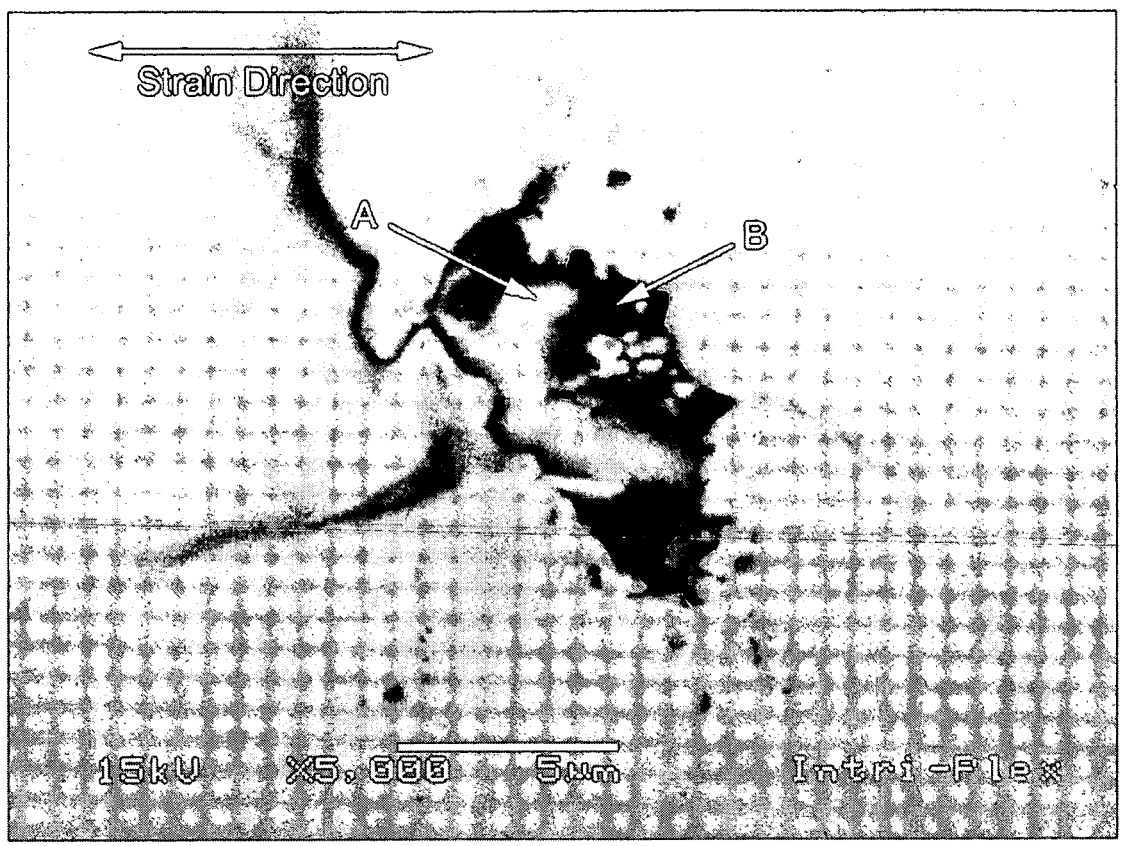
FIG. 10 shows the hard inclusion of FIG. 8 after a portion of the inclusion was released by plastic deformation due to bending.

Following bending, a substantial change in the morphology of the inclusion was observed and certain portions of the inclusion were released from the surface of the stainless steel. Two discrete areas within the inclusion shown in FIG. 8 labeled A and B demonstrate the release. These areas delineate separate "sub-inclusions" of the same composition. Contrast these regions to the corresponding areas in FIG. 10, similarly labeled A and B. The release of large sub-inclusion A is clearly seen in the comparison, as location A is denude of the darker inclusion material in FIG. 10. In contrast, the adjacent sub-inclusion B can be identified both prior to and after straining the swage mount. The direction of principle strain due to bending is also shown in the figure.

Aside from inclusion material release from the surface of the stainless steel, one of the largest changes in morphology following plastic deformation involves the expansion of the steel in the region of the inclusion. This occurs through a process of void growth driven by the plastic deformation itself, and results in a decreased contact area on the attached inclusion. It is this change in the material surrounding the inclusion that led to the release of sub-inclusion A, and is responsible for release in nearly 30% of the inclusions studied that were subject to plastic deformation. For example, clear evidence of inclusion or sub-inclusion displacement from the surface of the swage mount was found in 11 of 35 inclusions subject to a bend test. Other forms of plastic deformation that result in void growth may also increase the propensity for later inclusion release and consequent tribological problems in the disk drive due to released-particle interaction with the disk surface. This is particularly true for large-deformation processes, such as swaging (which may not be followed by an ultrasonic cleaning step).

While the invention has been particularly shown and described with reference to preferred embodiments thereof, it will be understood by those skilled in the art that the foregoing and other changes in form and detail may be made therein without departing from the scope of the invention.

What is claimed is:

1. A magnetic head supporting structure, comprising:
a magnetic head support structure component having a surface with fewer than 40 inclusions having largest dimension between 0.5 µm and 2 µm, per square millimeter.

2. The magnetic head supporting structure of claim 1 wherein the magnetic head support structure component comprises remelted metal.

3. The magnetic head supporting structure of claim 2 wherein the magnetic head support structure component comprises a swage mount.

4. The magnetic head supporting structure of claim 2 wherein the magnetic head support structure component comprises a magnetic head suspension spring.

5. The magnetic head supporting structure of claim 2 wherein the magnetic head support structure component comprises a magnetic head actuator arm.

6. A magnetic head supporting structure comprising:
a magnetic head support structure component having a surface with fewer than 40 inclusions having hardness 4 or higher on Mohs' Scale and having largest dimension between 0.5 µm and 2 µm, per square millimeter.

* * * * *